United States Patent Office 3,595,611
Patented July 27, 1971

3,595,611
CATION AND THERMAL STABILIZATION OF FAUJASITE-TYPE ZEOLITES
Carl Vance McDaniel, Laurel, Richard William Baker, Ellicott City, and Clark Ace Rundell, Silver Spring, Md., assignors to W. R. Grace & Co., New York, N.Y.
No Drawing. Filed Feb. 3, 1969, Ser. No. 796,215
Int. Cl. C01b 33/28
U.S. Cl. 23—111         5 Claims

ABSTRACT OF THE DISCLOSURE

A process for preparing a faujasite type zeolite having a silica to alumina ratio of at least 3.2 by treatnig the faujasite with a combination ammonium ion exchange and metal cation exchange including rare earth to reduce the $Na_2O$ level in the product to below 3% followed by thermal stabilization and a subsequent ammonium ion exchange. The resulting zeolite is characterized by high thermal stability and high catalytic activity and selectivity, particularly as a component in a hydrocarbon cracking catalyst.

---

The present invention relates to crystalline aluminosilicates, commonly referred to as molecular sieves. More specifically, this invention relates to the preparation of faujasite materials having a silica to alumina ratio of 3.2 to 7 characterized by high thermal stability and high catalytic activity.

Faujasite is a naturally occurring aluminosilciate having a characteristic X-ray structure. The synthetic materials designated zeolite X and zeolite Y by the Linde Division of Union Carbide Corporation are common examples of synthetic faujasites. This application is concerned with the faujasite designated zeolite Y. In U.S. Pat. 3,130,007, the chemical formula is given as follows:

$$0.9 \pm .2 Na_2O Al_2O_3 w SiO_2 x H_2O$$

where $w$ has a value of greater than 3 and up to about 6 and $x$ may have a value as high as 9.

Our novel synthetic faujasite uses the high silica zeolite as a starting material. The zeolite is converted to our novel product by combination of ammonium salt exchanges and metal cation salt exchanges including rare earth with an intermediate thermal treatment of the product. The converted faujasite is more thermally stable than the faujasites that have been exchanged with rare earth or other metal cations by conventional ion exchange techniques. In addition, the product shows particularly outstanding activity when used as a catalyst component.

There are several prior art processes for preparing the high silica faujasite type zeolites that are used as the starting material in the preparation of our novel zeolite. The sodium form of the faujasite is prepared from a mixture containing silica, alumina, and sodium hydroxide. The reactant mass is filtered to remove the zeolite crystals in the mother liquor. The composition of the reaction mixture is varied depending on the product composition desired. Employing an aqueous colloidal silica sol or a reactive amorphous silica, it is reported that the high silica form of faujasite can be obtained in the reaction mixture having a composition within the following range:

$Na_2O$ to $SiO_2$ _____ 0.4 to 6
$SiO_2$ to $Al_2O_3$ _____ 15 to 25
$H_2O$ to $Na_2O$ _____ 20 to 50

We have found that a high silica faujasite having good thermal stability and very high catalytic activity and selectivity when prepared as a component of a petroleum cracking catalyst can be prepared in a process which reduces the $Na_2O$ content of the high silica synthetic faujasite to about 3% by ammonium exchange, followed by exchange with rare earths and/or other cations to a level of about 0.3 to 10% by weight by exchange with appropriate salts followed by washing and thermally treating at a temperature about 700 to 1600° F. The product is then exchanged with an ammonium salt solution to remove the balance of the sodium, washed and dried.

Our novel zeolite has several advantages that are derived from this method of preparation. Since the rare earth (or other cation) content in the zeolite is low, these cations can be supplied by a solution containing sulfate. This advantage is particularly important when the stabilizing cations are mixed rare earths. The prior art processes utilize rare earth chlorides to provide the rare earth content of the zeolite. The rare earth sulfates are not soluble enough for use in preparing the concentrated solutions necessary for the preparation of a zeolite containing a high percentage of rare earth and care must be exercised to remove any sulfate present prior to rare earth exchange.

Concentrated rare earth chlorides are less satisfactory because chlorides attack the zeolite structure to some extent. There is less attack on the structure when the sulfates are present in the exchange solution.

The resulting novel product has the following properties:

(a) Thermal stability to 1700° F.,
(b) Rare earth or other cation content of 0.3 to 10% by weight,
(c) Surface area in excess of 800 square meters per gram,
(d) Catalytic activity superior to other low cation zeolites,
(e) A silica to alumina ratio of 3.2 to 7,
(f) Catalytic selectivity that can be varied to provide desirable products such as olefins, and
(g) An $Na_2O$ content of less than 1.0%.

The first step of the preparation of the product is the selection of a suitable zeolite raw material. The synthetic faujasite material should have a silica to alumina ratio between 3.2 and 7 to have the characteristic X-ray diffraction pattern indicating a high level of purity.

This material is base exchanged with ammonium salt, amine salt, or other salt which decomposes and leaves an appreciable portion of the zeolite in the hydrogen form. The exchange, if desired, may be carried out with a mixed solution containing an ammonium salt and another cation salt such as salts of magnesium, aluminum, nickel, iron, chromium, etc. Examples of suitable ammonium compounds of this type include ammonium chloride, ammonium sulfate, tetraethyl ammonium chloride, tetraethyl ammonium sulfate, etc. Ammonium sulfate because of its readily availability and low cost is the preferred reagent in this step of the process. The exchange is carried out with an excess of the ammonium salt solution. The salt is present in excess of about 20 to 600%, preferably about 20 to 300%.

The exchange is carried out rapidly at 100° C. However, temperatures in the 25 to 150° C. range give satisfactory results. The exchange is essentially complete in a period of about 0.5 to 24 hours.

Preliminary exchange reduces the alkali metal content of the zeolite to about 1.5 to 4% with a content of 2.5 to 3.5% being typical. After the exchange is completed, the zeolite is filtered and the cake returned to a solution of a salt containing a quantity of rare earth and/or other cation sufficient to provide 0.5 to 15% rare earth oxide or an equivalent amount or other cation. The exchange is carried out for a period of 30 to 120 minutes at a temperature of about 100° C.

The product is filtered and washed free of any excess salts. The cake is then calcined without predrying by heating to a temperature of about 700 to 1600° F. for a period of about 0.1 to 3 hours. The last step of the process is an exchange with ammonium salt and/or other metal cation salts. This final exchange reduces the $Na_2O$ content of the product from the 3% level to less than 1%. The zeolite is then washed, dried, and the product recovered.

In those cases where the zeolite is to be used as a component of a cracking catalyst and is suspended in a matrix, the final exchange step is not included since the final step in catalyst preparation generally consists of an ammonium exchange to remove sodium from the matrix component of the cracking catalyst.

The high silica synthetic faujasite is normally in the sodium form. However, it may be in any of the other alkali metal forms. By the term "alkali metal" we intend to include the elements of Group I-A, lithium through cesium. The term "rare earth elements" as used in this application, includes the elements from lanthanum to lutecium, atomic numbers 57 to 71. We also wish to include yttria.

The novel product is characterized by thermal stability to temperatures of 1700° F. This characteristic is an important attribute if the zeolite is to be used as a component of a fluid cracking catalyst used in fluid bed systems. The regeneration temperature in the fluid bed frequently approaches 1600° F. Our novel zeolite does not lose its crystal structure during thermal calcination at temperatures as high as 1700° F. or steam treatment with 25% steam at temperatures of 1525° F.

The X-ray pattern was determined using a Norelco X-ray diffractometer with a nickel filter, copper K radiation. The instrument was operated at 40 kv. operating potential and 20 ma. The sample to be run was mixed with 10% of a suitable inert internal standard, such as sodium chloride, and scanned from about 45° two-theta to about 60° two-theta and a goniometer speed of ½° per minute and a chart speed of ½ inch per minute.

The observed and theoretical (from National Bureau of Standards Circulars) values for the internal standard were used to correct systematic errors in observed values of two-theta.

Another characteristic of our novel product is the surface area. The surface area of our product is in excess of 800 square meters per gram. The surface area is measured by the well known Brunauer Emmett Teller (BET) Method.

In addition, our novel product has an unusually high catalytic activity and the selectivity can be altered by the proper choice of metal cations. For example, the rare earth form containing about 1 to 8% $RE_2O_3$ exhibits a high degree of selectivity for producing olefins.

Our invention is further illustrated by the following specific but non-limiting examples.

EXAMPLE 1

This example illustrates a satisfactory method of preparing the high silica faujasite zeolite which is used as a raw material in preparing our novel product.

A solution was prepared to contain 90.6 grams of sodium hydroxide in 96.5 grams of water. A total of 52 grams of alumina trihydrate was dissolved in this solution. The solution was diluted with 195 grams of water. The solution was added to a paste made from 454 grams of water and 219 grams of fine size silica having a particle size of 0.02 to 10 microns. The mixture was digested at 35° C. for five days and refluxed at 100° C. for two days. The product was filtered and washed. The product displayed the following X-ray diffraction lines:

Table A $d$ (A.):

| | |
|---|---|
| 14.6±0.3 | 100 |
| 8.9±0.15 | 34 |
| 7.56±0.06 | 22 |
| 5.75±0.05 | 40 |
| 4.81±0.03 | 12 |
| 4.41 | 20 |
| 3.95 | 10 |
| 3.81 | 48 |
| 3.34±0.02 | 11 |
| 2.947±0.010 | 19 |
| 2.882 | 44 |
| 2.794 | 18 |
| 2.661±0.05 | 18 |

EXAMPLE 2

This example illustrates a method of preparing our novel product.

A total of 200 grams (dry basis) of the high silica zeolite, prepared according to the method described in Example 1, was slurried with 200 grams of water containing 200 grams of ammonium sulfate. The slurry was heated to 100° C. for one half hour with stirring, filtered, and the exchange repeated. The material was filtered and the cake returned to a third solution containing the same quantity of ammonium sulfate and water but also a quantity of rare earth chloride solution sufficient to provide 0.07 pound of REO per pound of zeolite. The exchange was carried out for a period of 30 minutes at 100° C. The zeolite was filtered and washed free of sulfate. The zeolite was then calcined without predrying at a temperature of 1300–1350° F. for three hours. After calcination, the product was cooled to room temperature. The zeolite was exchanged three additional times with ammonium sulfate using zeolite to sulfate to water ratios of 1 to 20. Each exchange was carried out at a temperature of 100° C. for a period of 30 minutes. At the end of this period, the $Na_2O$ content of the product had decreased to 0.17 percent.

The surface area of the material, as determined by the well known Brunauer-Emmett-Teller Method (S. Brunauer, P. Emmett, and E. Teller, J. Am. Chem. Soc., 60, 309, 1928), was 870 square meters per gram.

The rare earth oxide content was 4.73%. After calcination at 1650° F. for two hours, it retained a surface area of 635 square meters per gram indicating a high order of stability.

EXAMPLE 3

This example illustrates a method of preparing high silica faujasite from clay.

A reactant mixture was prepared by mixing 660 grams of calcined kaolin with 2130 grams of sodium silicate solution. The mixture was aged for a period of 16 hours and added to a solution prepared by mixing 200 grams of sodium hydroxide, 3500 grams of water, and 3500 grams of sodium silicate.

A zeolite "seed" slurry was prepared by mixing 29 grms of sodium aluminate ($Na_2O \cdot Al_2O_3 \cdot 3H_2O$) in 368 grams of water. A solution containing 420 grams of sodium silicate, 112 grams of NaOH, and 100 grams of water was prepared. The solutions were cooled to 0° C. and mixed with stirring for one hour at 0° C. A zeolite "seed" product was recovered having a particle size of 0.01 micron, a silica to alumina ratio of about 2.5 and no detectable crystallinity. The sodium silicate used in these runs contained 28.5 percent $SiO_2$ and 8.7 percent $Na_2O$, the balance being water.

A total of 400 ml. of the "seeds" were added to the kaolin-silicate solution and the mixture was heated at 100° C. for a period of 34 hours. The product was filtered and washed. A sample of the product was removed, dried and the surface area determined. The zeolite had a surface area of 940 square meters per gram.

EXAMPLE 4

This example describes the conversion of the zeolite prepared according to the method of Example 3 to our novel product.

A total of 1000 grams (dry basis) of the zeolite prepared according to the method of Example 3 was slurried with a solution of 10,000 grams of water containing 1000 grams of ammonium sulfate. The slurry was heated to 100° C. and exchanged for a period of one hour. The slurry was filtered and the exchange repeated using a fresh ammonium sulfate solution. The zeolite was filtered and the cake returned to a third solution containing 1000 grams of ammonium sulfate in 10,000 grams of water and 92.5 grams of lanthanum nitrate $(La(NO_3)_3 \cdot 6H_2O)$. Exchange was carried out for a period of one hour at a temperature of 100° C. The zeolite was filtered and washed free of sulfate. The zeolite was calcined without predrying at a temperature of 1350° F. for a period of 30 minutes. The product at this point had an $Na_2O$ content of 2.71% and a lanthanum oxide content of 2.12%.

After calcination, the product was cooled to room temperature and subjected to another ammonium sulfate exchange. The zeolite was exchanged three additional times with an ammonium sulfate solution using a zeolite sulfate to water ratio of 1:2:20. Each exchange was carried out at a temperature of 100° C. for a period of 30 minutes The product was dried, analyzed, and found to have an $Na_2O$ content of 0.71%, a rare earth content of 1.36% and a surface area of 930 square meters per gram. After calcination of 1650° F. for two hours, the product retained a surface area of 723 square meters per gram indicating very good stability.

EXAMPLE 5

This example illustrates the preparation of a lanthanum form of our novel zeolite.

A total of 200 grams (dry basis) of a high silica faujasite was exchanged with ammonium sulfate using a zeolite to ammonium sulfate to water ratio of 1:1:10. The exchange was carried out at 100° C. for 30 minutes. The product was filtered and the exchange repeated using a fresh ammonium sulfate solution.

Two hundred grams of this ammonium exchanged zeolite was exchanged with a solution made up to contain 200 grams of ammonium sulfate, 18.5 grams of lanthanum nitrate $(La(NO_3)_3 \cdot 6H_2O)$ and 2 liters of water. The exchange was carried out at 100° C. for a period of 30 minutes. The product was washed and calcined for three hours at 1300° F. The calcined material was cooled and exchanged three times with ammonium sulfate using zeolite to ammonium sulfate to water ratios of 1:1:20. The product was dried and analyzed. The analysis, in weight percent, was as follows:

$Na_2O$ _____ 0.14
Lanthanum oxide _____ 1.13

The surface area after calcination for two hours at 1650° F. was 770 square meters per gram.

EXAMPLE 6

In this example, the general technique described in Example 5 was used except that varying amounts of lanthanum nitrate were used to prepare the solution for the second exchange. Five runs were made where the amount of nitrate per 100 grams of zeolite was caried from 9.25 to 46.25. The effect of this increase in lanthanum on the surface area properties after calcination for two hours at 1700° F., is shown in the table below:

TABLE B

| Run No. | $La(NO_3)_3 \cdot 6H_2O$ per 100 gm. zeolite | $Na_2O$ in product, wt. percent | $La_2O_3$ in product, wt. percent | Surface area after 2 hrs. at 1,700° F., m.²/g. |
|---|---|---|---|---|
| 1 | 9.25 | .26 | 2.34 | 710 |
| 2 | 18.50 | .24 | 4.73 | 830 |
| 3 | 27.75 | .42 | 8.38 | 395 |
| 4 | 37.00 | .47 | 11.15 | 360 |
| 5 | 46.25 | .25 | 12.09 | 380 |

It is obvious from these data that the zeolites with the smaller lanthanum content have greater stability to thermal treatment.

EXAMPLE 7

Several runs were made to investigate the effect of calcination temperature on the surface area of the product.

In this series of runs, the general technique described in Example 5 was used except that the conditions of calcination were varied. The surface area of the material after calcination at 1650° F. was used as a guide to determine the stability of the zeolite. A total of nine runs were made. The calcination conditions were varied from a calcination of 1000° for 30 minutes to a calcination of 1350° for two hours. The samples were tested for stability by calcination for two hours at 1000° F. retaining a sample for 8 days and recalcining at 1650° F. for two hours. The surface area after this high temperature calcination gives a guide as to the effect of calcination temperature on the stability of the product.

TABLE C

| Calcination conditions | SA after stability test at 1,650° F., m.²/g. | |
|---|---|---|
| | Fresh | Dried and aged 1 week |
| Run No.: | | |
| 1 _____ 1,000° F./30 min _____ | 715 | 285 |
| 2 _____ 1,000° F./1 hour _____ | 760 | 255 |
| 3 _____ 1,050° F./2 hours _____ | 745 | 195 |
| 4 _____ 1,100° F./2 hours _____ | 780 | 570 |
| 5 _____ 1,150° F./2 hours _____ | 785 | 515 |
| 6 _____ 1,200° F./2 hours _____ | 780 | 600 |
| 7 _____ 1,250° F./2 hours _____ | 727 | 545 |
| 8 _____ 1,300° F./2 hours _____ | 727 | 720 |

These data demonstrate that all the calcination temperatures result in equally stable products. However, the samples calcined at lower temperatures do exhibit a loss in surface area when dried and aged for one week.

EXAMPLE 8

Two metal cations were introduced into the zeolite using the following procedure: The sodium zeolite was exchanged to about 3% $Na_2O$ with ammonium sulfate using the general technique described in Example 5 and a zeolite to ammonium sulfate to water ratio of 1:1:10. The metal cations were introduced simultaneously by ion exchange using a solution containing 250 grams of water, 1.25 grams $RE_2O_3$ as the chloride and 1.25 grams Co as the chloride for 25 grams of zeolite. The product after the exchange was calcined for two hours at 1300° F. In the third step, the $Na_2O$ content of the product was reduced to less than 0.5% by exchange with ammonium sulfate. The product was then washed and dried and evaluated. The surface areas of the final product after calcination for two hours at 1000°, 1500°, 1600°, 1650°, and 1700° F. were determined. This data is set out in the table below:

TABLE D

| | Calcination temperature, °F. | SA after calcination for two hours, m.²/g. |
|---|---|---|
| Run No.: | | |
| 1 | 1,000 | 820 |
| 2 | 1,500 | 810 |
| 3 | 1,600 | 790 |
| 4 | 1,650 | 720 |
| 5 | 1,700 | 425 |

The catalytic behavior was determined by the ability to crack butane using a microactivity test. A high degree of cracking activity was observed compared to commercial petroleum cracking catalysts such as 28% silica alumina.

EXAMPLE 9

This example illustrates the preparation of a form of our novel zeolite having more than one ion species.

A total of 800 grams (dry basis) of a high silica faujasite was exchanged with 800 grams of ammonium sulfate dissolved in 8000 grams of water (zeolite to ammonium sulfate to water ratio of 1:1:10). The exchange was carried out at 100° C. for 30 minutes. The product was filtered and the exchange repeated using a fresh ammonium sulfate solution. A total of 800 grams of the ammonium sulfate exchanged zeolite was exchanged with the solution made up to contain 800 grams of ammonium sulfate, 100 ml. of the rare earth chloride solution (56 grams of rare earth oxide) and 8 liters of water. The exchange was carried out at 100° C. for a period of 30 minutes. The product was washed and calcined for two hours at 1300° F.

The calcined material was cooled and exchanged three times with ammonium sulfate using a zeolite to ammonium sulfate to water ratio of 1:3:60. The product was dried and analyzed. The analysis in in weight percent was as follows:

$Na_2O$ _____ 0.14
$Re_2O_3$ _____ 1.1

This zeolite was used as a starting material in preparing the zeolites having more than one ion species.

Twenty gram samples were exchanged in varying salt solutions that contain 1 gram of cation in 200 grams of water. The exchange was carried out at a temperature of 100° C. for a period of one hour. The samples were washed, dried, and the catalytic behavior was determined by the ability of the sample to crack butane using a microactivity test. The data collected in this seeries of runs is set out in Table E. In each of these samples, the surface area after calcination at 1350° F. was determined. The catalytic activtiy using the microactivity test was determined after heating the samples at a temperature of 1500° F. for a period of two hours.

TABLE E

| Run No. | Catalyst | Surface area | Catalytic activity after pretreat, percent |
|---|---|---|---|
| 1 | Catalyst A | | 7 |
| 2 | Catalyst B | 355 | 35 |
| 3 | Catalyst C | 750 | 67 |
| 4 | $Al^{+3}$ $AlCl_3.6H_2O$ | 710 | 43 |
| 5 | $CO^{+2}$ $CoCl_2.6H_2O$ | 820 | 89 |
| 6 | $Cr^{+3}$ $CrCl_3.6H_2O$ | 750 | 78 |
| 7 | $Cu^{+2}$ $CuCl_2.2H_2O$ | 690 | 36 |
| 8 | $Fe^{+2}$ $FeSO_4.7H_2O$ | 760 | 74 |
| 9 | $Fe^{+3}$ $FeCl_3.6H_2O$ | 670 | 89 |
| 10 | $La^{+3}$ $La(NO_3)_3.6H_2O$ | 835 | 64 |
| 11 | $Li^+$ $LiCl$ | 790 | 46 |
| 12 | $Mg^{+2}$ $MgSO_4.7H_2O$ | 810 | 42 |
| 13 | $Mn^{+2}$ $MnSO_4.H_2O$ | 820 | 68 |
| 14 | $Ni^{+2}$ $NiCl_2.6H_2O$ | 800 | 67 |
| 15 | $K^+$ $KCl$ | 635 | 30 |
| 16 | $ZrO^{+2}$ $ZrOCl_2.8H_2O$ | 790 | 59 |

The catalytic activity was compared with the catalytic activity of three standard catalysts. Catalyst A was a conventional silica alumina cracking catalyst containing 28% alumina. Catalyst B was a catalyst promoted with a Type X zeolite wherein the zeolite fraction of the catalyst contained about 25 weight percent rare earth oxide. Catalyst C was a catalyst promoted with a Type Y zeolite. The zeolite fraction of the catalyst contained about 17 weight percent rare earth oxide.

These data are interesting from the wide range of activities observed. Use of a mixed potassium rare earth zeolite, for example, results in a catalyst having the activity about the same as Catalyst B. Much improved activity is observed with the use of cobalt or iron as the second component.

EXAMPLE 10

In this example, the calcination step was carried out at 700° F. and 1300° F.

One hundred grams (dry basis) of a Type Y zeolite was exchanged with ammonium sulfate solution using zeolite to ammonium sulfate to water ratio of 1:1:10. The exchange was repeated using two separate exchanges with fresh ammonium sulfate solutions. The zeolite at this stage contained less than 3% $Na_2O$.

The zeolite was then exchanged in a solution of mixed rare earth chlorides with the ratios of zeolite to rare earth (as the oxide) to water of 1:0.06:10.

The product was filtered, washed, and divided into two equal portions. Portion A was calcined two hours at 700° F. and Portion B was calcined two hours at 1300° F.

The sodium was further reduced by exchanging each sample twice in ammonium sulfate solution using zeolite to ammonium sulfate to water ratio of 1:3:60.

The following results were obtained:

TABLE F

| | A (700° F. calcination) | B (1,300° F. calcination) |
|---|---|---|
| $Na_2O$ after calcination step, percent | 2.54 | 2.54 |
| $Na_2O$ in final product, percent | 0.45 | 0.27 |
| REO in final product, percent | 5.1 | 5.2 |
| Surface area, m.²/g.: | | |
| 2 hrs/1,000° F | 874 | 857 |
| 2 hrs/1,650° F | 824 | 830 |
| 2 hrs/1,700° F | 745 | 720 |

These results show that the products are very stable and that the $Na_2O$ has been reduced to well below 1%.

EXAMPLE 11

A series of runs were made in which various cations were evaluated for their ability to form stable and catalytically active zeolites.

A sodium Y zeolite was exchanged twice with ammonium sulfate using zeolite to ammonium sulfate to water ratio of 1:1:10. Samples (20 grams dry basis) of the zeolite were then exchanged with various salt solutions containing 1.0 gram of cation and 100 grams of water. The exchangers were carried out at 100° C. for 1 hour. The products were then washed and calcined at 1300° F. for two hours. The calcined samples were then exchanged two additional times with ammonium sulfate using zeolite to ammonium sulfate to water ratio of 1:3:60.

The products were then evaluated for stability by calcination at 1500° F. and 1650° F. Their catalytic activity was determined by butane cracking at 900° F. in the micro-activity test. Results are shown in the following table:

TABLE G

| Run No. | Catalyst | Surface area after calcination at— | | Catalytic activity after pretreatment, percent |
|---|---|---|---|---|
| | | 1,500° F. | 1,650° F. | |
| 1 | Catalyst A | | | 7 |
| 2 | Catalyst B | 735 | 355 | 35 |
| 3 | Catalyst C | 790 | 750 | 67 |
| 4 | $Al^{+3}$ $AlCl_3.6H_2O$ | 420 | | 27 |
| 5 | $CO^{+2}$ $CoCl_2.6H_2O$ | 720 | 690 | 64 |
| 6 | $Cr^{+3}$ $CrCl_3.6H_2O$ | 720 | 650 | 52 |
| 7 | $Cu^{+2}$ $CuCl_2.2H_2O$ | 560 | 230 | 17 |
| 8 | $Fe^{+2}$ $FeSO_4.7H_2O$ | 780 | 700 | 58 |
| 9 | $Fe^{+3}$ $FeCl_3.6H_2O$ | 460 | | 47 |
| 10 | $La^{+3}$ $La(NO_3)_3.6H_2O$ | 820 | 760 | 72 |
| 11 | $Li^+$ $LiCl$ | 760 | 630 | 56 |
| 12 | $Mg^{+2}$ $MgSO_4.7H_2O$ | 740 | 650 | 43 |
| 13 | $Mn^{+2}$ $MnSO_4.H_2O$ | 790 | 610 | 61 |
| 14 | $Ni^{+2}$ $NiCl_2.6H_2O$ | 770 | 650 | 64 |
| 15 | $K^+$ $KCl$ | 320 | | 14 |
| 16 | $ZrO^{+2}$ $ZrOCl_2.8H_2O$ | 630 | | 63 |

The catalytic activity was compared using the same standards in Example 9. The surface area of the catalyst was determined after calcination at 1500 and 1650° F. The catalytic activity was determined using the same technique as described in Example 9.

As in the runs summarized in Example 9, these zeolites exhibited a wide spectrum of catalytic activity.

EXAMPLE 12

This example illustrates the method of preparing a catalyst which incorporates our novel zeolite. The catalyst used in this test was a semi-synthetic cracking catalyst containing 60% of a synthetic component having an alumina content of 28% (derived from alum) and 72% $SiO_2$ (derived from sodium silicate). The synthetic component was mixed with 40% kaolin clay.

To fifteen gallons of dilute sodium silicate solution containing 14.8 grams per liter of $Na_2O$ and 48.8 grams per liter of $SiO_2$ ($SiO_2:Na_2O$ weight percent of 3.3:1) were added 5½ lbs. (4.7 lbs. dry basis) of Georgia kaolin clay. The clay-silicate mixture was dispersed by agitation and continuous recirculation by means of centrifugal pump. This first mass was then contacted with carbon dioxide to form a silica hydrogel containing dissolved sodium carbonate. This was accomplished by contacting the clay-silicate mixture with carbon dioxide in a mixing coil which was submerged in a tank of heated water to control gelation. The reaction slurry was then passed out of the coil into a gelation tank. Flow rates were controlled so that gelation occurred in one minute after the material had flowed into the tank. The pH was adjusted to 9.6 and the temperature to 95° C.

The mass was then aged one hour at 95° C. and 9,200 ml. of an alum (aluminum sulfate) solution containing 92.5 grams per liter of alumina was added. The pH of the mixture was then adjusted to 5.6 with ammonia. After the pH adjustment was completed, a slurry of the desired zeolite component was added. The composite was mixed for 5 minutes and filtered. The filter cake was reslurried with water and passed through a commercially available homogenizer operating at a pressure of 2,000 lbs. per square inch. The homogenized slurry was then spray dried. Particle size analysis showed that 53% of the product passed through a 200 mesh screen. The spray dried product was then washed 5 times with 2° Bé ammonium sulfate solution at a temperature of 135° F. followed by three washings with ammoniated distilled water adjusted to a pH of 8.5.

Separate zeolite promoted catalysts were prepared for testing. The catalyst designated Catalyst A contained our novel zeolite having a rare earth content of 0.7%. Catalyst B contained the same zeolite except that the rare earth content of zeolite was 3%. Catalyst C contained an X type zeolite. Catalyst D contained the zeolite described in some detail in U.S. Pat. 3,293,192.

The cracking characteristics of the catalyst were compared after steam deactivation at 1520° F. using 20% steam in a pilot test unit using a West Texas gas oil feed and a constant feed rate of 10 weight hourly space velocity. The analysis of the catalyst in the physical properties after thermal and steam treatment is set out in Table H.

TABLE H

| Catalyst | A | B | D |
|---|---|---|---|
| Analysis in wt. percent: | | | |
| Rare earth oxide | 0.01 | 0.122 | |
| $Na_2O$ | 0.029 | 0.025 | 0.082 |
| $Al_2O_3$ | 30.4 | 32.2 | 31.9 |
| $SO_4$ | 0.13 | 0.17 | 0.27 |
| After thermal treatment for 3 hours at 1,000° F.: | | | |
| Surface area in m.²/g | 310 | 280 | 321 |
| Pore volume in cc./g | 0.57 | 0.57 | 0.62 |
| After thermal treatment for 3 hours at 1,550° F.: | | | |
| Surface area in m.²/g | 240 | 212 | 269 |
| Pore volume in cc./g | 0.49 | 0.47 | 0.54 |
| After thermal treatment for 3 hours at 1,600° F.: | | | |
| Surface area in m.²/g | 190 | 223 | 237 |
| Pore volume in cc./g | 0.42 | 0.38 | 0.51 |
| After thermal treatment for 3 hours at 1,650° F.: | | | |
| Surface area in m.²/g | 139 | 150 | 211 |
| Pore volume in cc./g | 0.33 | 0.31 | 0.41 |
| After treatment with steam of 15 p.s.i.g. at 1,350° F.: | | | |
| Surface area in m.²/g | 148 | 148 | |
| Pore volume in cc./g | 0.44 | 0.39 | |
| After treatment with steam of 15 p.s.i.g. at 1,520° F.: | | | |
| Surface area in m.²/g | 130 | 150 | 126 |
| Pore volume in cc./g | 0.37 | 0.42 | 0.36 |

Each of the catalysts had satisfactory surface area and pore volume retention after the thermal and hydrothermal deactivation. The catalysts retained 70–80% of their 1000° crystallinity after a three hour thermal treatment at 1650° and 75% of their 1000° crystallinities after steam treatment at 1520° F. using 20% steam. A comparison of the cracking characteristics of the four catalysts are set out in Table I below:

TABLE I.—COMPARISON OF CRACKING CHARACTERISTICS

| Catalyst | A | B | C | D |
|---|---|---|---|---|
| Wt. percent promoter | 6.1 | 6.1 | 9.5 | 7.0 |
| Volume percent conversion at 10 weight hourly space velocity | 68 | 67 | 74.5 | 59 |
| Product analysis: | | | | |
| $H_2$ in wt. percent | 0.038 | 0.040 | 0.032 | 0.055 |
| $C_1+C_2$ in wt. percent | 2.0 | 1.9 | 1.7 | 1.9 |
| Total $C_3$ in volume percent | 11.5 | 11.2 | 10.5 | 8.5 |
| $C_3$ (unsat.) in volume percent | 10.2 | 10.3 | 9.3 | 7.4 |
| Total $C_4$ in volume percent | 10.6 | 9.7 | 8.9 | 7.4 |
| $C_4$ (unsat.) in volume percent | 6.2 | 5.7 | 3.2 | 4.8 |
| Iso $C_4$ in volume percent | 4.0 | 3.6 | 5.3 | 3.0 |
| $C_5$+gasoline in volume percent | 57 | 57 | 66 | 51.5 |
| Light cycle oil in volume percent | 10.5 | 10.0 | 11.0 | 10.0 |
| Coke in weight percent | 2.8 | 2.7 | 3.6 | 2.7 |

It is important to note the improved selectivity of the catalyst prepared with our novel zeolite (Catalysts A and B). The volume percent of the $C_3$ unsaturated fraction and the $C_4$ unsaturated fraction is substantially higher when the catalyst is promoted with our novel zeolite composition.

Although the percent conversion of the catalyst is lower then the conversion of the catalyst containing rare earth promoted Type X zeolite, (Catalyst C), this slight disadvantage is more than overcome by the gerat improvement in selectivity of the catalyst as well as the decreased amount of coking in the catalytic reaction.

The cracking characteristics of the catalyst promoted with our novel zeolite were compared with a catalyst promoted with the zeolite described in U.S. Pat. 3,293,192 (Catalyst F). A test was carried out in the pilot unit at a temperature of 920° F. The feed was West Texas heavy gas oil. Each of the catalysts were deactivated at 1520° F. using 20% steam for the deactivation prior to the test. Catalyst F contained 15% more zeolite than the catalyst that was prepared to contain our novel zeolite. The test was carried out at a constant conversion of about 59 to 59.5 volume percent of the hydrocarbons. The data collected in this series of runs is set out in Table J below:

TABLE J.—COMPARISON OF CRACKING CHARACTERISTICS

| Catalyst | E | F |
|---|---|---|
| Wt. percent promoter | 6.1 | 7.0 |
| Conversion in volume percent | 5.90 | 59.0 |
| At a feed rate of (weight hourly space velocity) | 20 | 10 |
| Product analysis: | | |
| $H_2$ in weight percent | 0.035 | 0.055 |
| $C_1+C_2$ in weight percent | 1.6 | 1.9 |
| Total $C_3$'s in volume percent | 8.8 | 8.5 |
| $C_3$ (unsat.) in volume percent | 8.1 | 7.4 |
| Total $C_4$'s in volume percent | 7.2 | 7.4 |
| $C_4$ (unsat.) in volume percent | 4.0 | 4.1 |
| Iso $C_4$ in volume percent | 2.9 | 3.0 |
| $C_5$+gasoline in volume percent | 52.5 | 51.5 |
| Light cycle oil in volume percent | 11.0 | 10.0 |
| Coke in wt. percent | 2.2 | 2.7 |

These data show clearly that the catalyst promoted with our novel zeolite was much more active than the catalyst prepared to contain the 192 zeolite. The feed rate to Catalyst E was twice the feed rate to Catalyst F.

A series of the promoted catalysts were compared at 70 volume percent conversion after a typical steam deactivation at 1520° F. using 20% steam. The catalysts designated A and B were promoted with our novel zeolite. Catalyst C was promoted with a rare earth exchanged Type Y zeolite, Catalyst D with a rare earth promoted Type X zeolite.

TABLE K

Comparison of catalyst at constant 70 volume percent conversion after steam deactivation at 1,520° F., 20% steam]

| Catalyst | A | B | C | D |
|---|---|---|---|---|
| Wt. percent promoter | 6.1 | 6.1 | 6.1 | 9.5 |
| Feed rate | 7.5 | 6.7 | 23 | 17 |
| C₃+C₄ (unsat.) in volume percent | 17.6 | 18.4 | 11.7 | 11.2 |
| C₅+gasoline in volume percent | 57.5 | 57.5 | 63 | 63 |
| Coke in wt. percent | 3.0 | 3.0 | 2.6 | 3.1 |

A large volume of $C_3$ and $C_4$ unsaturates were recovered in Catalyst A and B than in Catalyst C and D.

Obviously, many modifications and variations of the invention may be made without departing from the essence and scope thereof and only such limitations should be applied as are indicated in the appended claims.

What is claimed is:

1. A process for preparing a zeolite crystalline aluminosilicate having a silica to alumina ratio of about 3.2 to 7.0 and improved catalytic properties, which comprises the steps of:
   (a) Preparing a faujasite type zeolite in the sodium form having a silica to alumina ratio of about 3.2 to 7,
   (b) Reducing the $Na_2O$ content of the zeolite to about 1.5 to 4 weight percent by ion exchange with a cation which upon thermal decomposition leaves an appreciable portion of the zeolite in the hydrogen form,
   (c) Ion-exchanging the zeolite with a rare earth salt solution in a concentration sufficient to impart a rare earth content of about 0.3 to 10% by weight to the zeolite,
   (d) Drying and calcining the exchanged zeolite at a temperature of from about 700 to 1600° F. for about 0.1 to 3 hours,
   (e) Exchanging with an ammonium salt solution to decrease the sodium oxide content to below 1 weight percent, and
   (f) Washing, drying, and recovering the zeolite product.

2. The process according to claim 1 wherein the rare earth ions are introduced into the zeolite by ion exchange with a mixed rare earth-ammonium salt solution.

3. The process according to claim 1 wherein ion exchanges in steps (b) and (e) are carried out with an ammonium salt solution containing a salt selected from the group consisting of ammonium sulfate, ammonium chloride, tetraethyl ammonium chloride, and tetraethyl ammonium sulfate.

4. The process according to claim 1 wherein the ion exchange in step (b) is carried out with an ammonium salt solution at a temperature of about 25 to 115° C. for a period of about 0.5 to 24 hours.

5. A process for preparing a zeolitic crystalline aluminosilicate having a silica to alumina ratio of about 3.2 to 7 weight percent and improved catalytic properties which comprises:
   (a) Preparing a faujasite in the sodium form having a silica to alumina ratio of 3.2 to 7.0,
   (b) Reducing the $Na_2O$ content of the zeolite to about 3 weight percent by ion exchange with an ammonium sulfate solution,
   (c) Contacting the zeolite with a rare earth salt solution to impart a rare earth content of 0.3 to 10 weight percent by weight to the zeolite by ion exchange,
   (d) Drying and calcining the zeolite at a temperature of about 700 to 1600° F. for about 0.1 to 3 hours,
   (e) Ion exchanging with an ammonium sulfate solution to decrease to sodium oxide content below about 1 weight percent, and
   (f) Washing, drying, and recovering the zeolite product.

References Cited

UNITED STATES PATENTS

| | | | |
|---|---|---|---|
| 3,293,192 | 12/1966 | Maher et al. | 23—111X |
| 3,393,147 | 7/1968 | Dwyer et al. | 208—120 |
| 3,402,996 | 9/1968 | Maher et al. | 23—112 |
| 3,425,956 | 2/1969 | Baker et al. | 252—455 |
| 3,449,070 | 6/1969 | McDaniel et al. | 23—111 |
| 3,508,867 | 4/1970 | Frilette et al. | 23—111 |

EDWARD J. MEROS, Primary Examiner

U.S. Cl. X.R.

208—120; 252—455